(12) United States Patent
Gerendas

(10) Patent No.: US 10,401,029 B2
(45) Date of Patent: Sep. 3, 2019

(54) DEVICE FOR COOLING A WALL OF A COMPONENT OF A GAS TURBINE

(71) Applicant: Rolls-Royce Deutschland Ltd & Co KG, Blankenfelde-Mahlow (DE)

(72) Inventor: Miklos Gerendas, Am Mellensee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 578 days.

(21) Appl. No.: 15/171,446

(22) Filed: Jun. 2, 2016

(65) Prior Publication Data

US 2016/0356498 A1 Dec. 8, 2016

(30) Foreign Application Priority Data

Jun. 5, 2015 (DE) .................. 10 2015 210 385

(51) Int. Cl.
*F01D 5/18* (2006.01)
*F23R 3/00* (2006.01)
*F02C 7/18* (2006.01)

(52) U.S. Cl.
CPC .............. *F23R 3/005* (2013.01); *F01D 5/186* (2013.01); *F01D 5/187* (2013.01); *F02C 7/18* (2013.01); *F23R 3/002* (2013.01); *F23R 3/007* (2013.01); *F05D 2220/32* (2013.01); *F05D 2240/35* (2013.01); *F05D 2250/24* (2013.01); *F05D 2250/711* (2013.01); *F05D 2260/202* (2013.01); *F23R 2900/03042* (2013.01)

(58) Field of Classification Search
None
See application file for complete search history.

(56) References Cited

U.S. PATENT DOCUMENTS

| | | | | |
|---|---|---|---|---|
| 8,057,181 B1* | 11/2011 | Liang | ...................... | F01D 5/186 416/97 R |
| 8,066,484 B1* | 11/2011 | Liang | ...................... | F01D 5/186 415/115 |
| 8,683,814 B2 | 4/2014 | Xu | | |
| 8,763,402 B2* | 7/2014 | Xu | ........................ | F01D 5/186 60/752 |
| 9,410,435 B2* | 8/2016 | Xu | ........................ | F01D 5/186 |
| 9,416,971 B2* | 8/2016 | Xu | ............................ | F23R 3/06 |
| 2005/0286998 A1 | 12/2005 | Lee et al. | | |

(Continued)

FOREIGN PATENT DOCUMENTS

| | | |
|---|---|---|
| CA | 2282010 A1 | 3/2000 |
| EP | 0985802 A1 | 3/2000 |
| EP | 2937513 | 10/2015 |

OTHER PUBLICATIONS

European Search Report dated Oct. 14, 2016 for counterpart European Application No. 16172713.6.

(Continued)

*Primary Examiner* — Carlos A Rivera
*Assistant Examiner* — Theodore C Ribadeneyra
(74) *Attorney, Agent, or Firm* — Shuttleworth & Ingersoll, PLC; Timothy Klima

(57) ABSTRACT

A device for cooling a wall of a component of a gas turbine, where a flow passes parallel to the wall, having at least one inflow duct provided in the wall that issues into a recess of the wall for supplying cooling air, wherein a center axis of the inflow duct is aligned to an impact wall of double-convex design inside the recess.

17 Claims, 6 Drawing Sheets

(56) References Cited

U.S. PATENT DOCUMENTS

Figure 1:
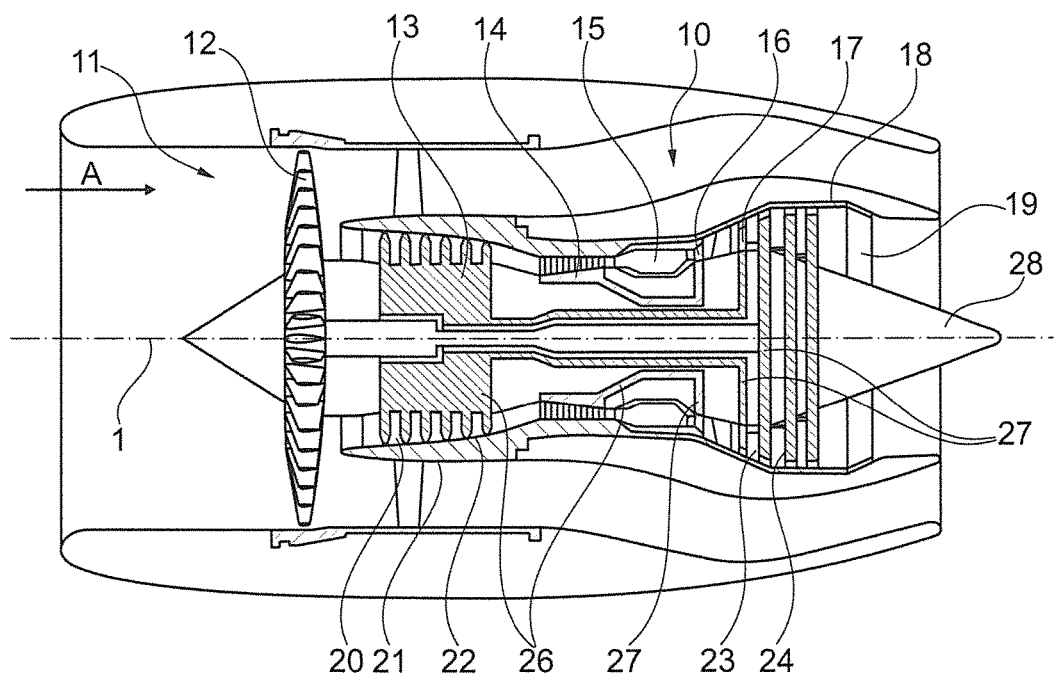

| | | | |
|---|---|---|---|
| 2008/0003096 A1* | 1/2008 | Kohli | F01D 5/186 415/115 |
| 2011/0097191 A1* | 4/2011 | Bunker | F01D 5/186 415/115 |
| 2011/0305582 A1 | 12/2011 | Lee et al. | |
| 2012/0051941 A1 | 3/2012 | Bunker | |
| 2012/0167389 A1* | 7/2012 | Lacy | B23P 6/002 29/889.1 |
| 2013/0175015 A1* | 7/2013 | Tanaka | F01D 5/186 165/168 |
| 2013/0205794 A1* | 8/2013 | Xu | F01D 5/186 60/754 |

OTHER PUBLICATIONS

German Search Report dated Mar. 14, 2016 from counterpart German App No. 102015210385.4.

* cited by examiner

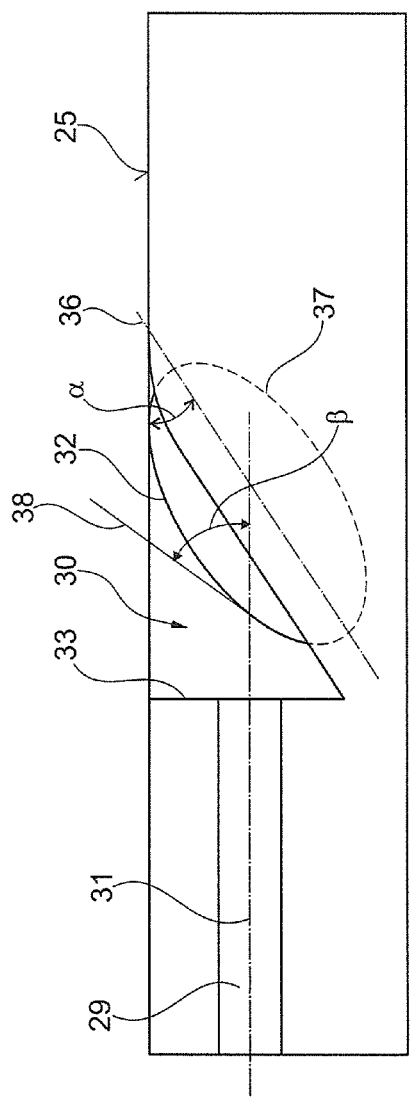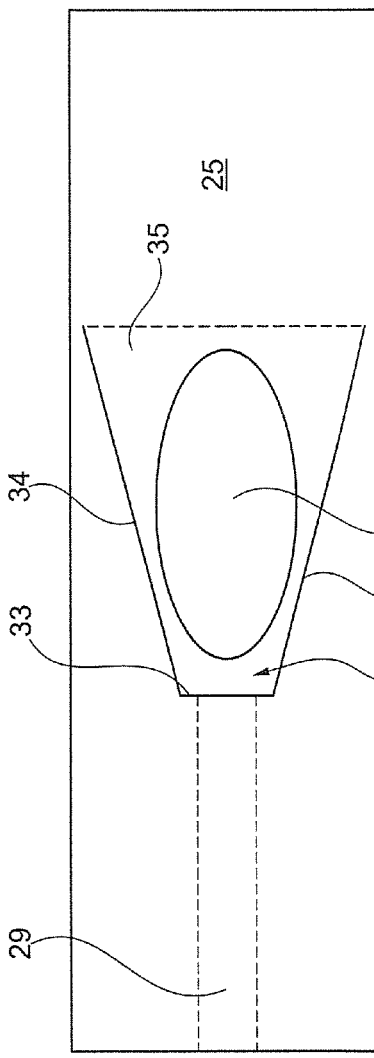

DEVICE FOR COOLING A WALL OF A COMPONENT OF A GAS TURBINE

This application claims priority to German Patent Application 102015210385.4 filed Jun. 5, 2015, the entirety of which is incorporated by reference herein.

This invention relates to a device for cooling a wall of a component of a gas turbine.

In detail, the invention relates to a device for cooling a wall, along which a fluid flow passes. Walls of this type are, for example, combustion chamber walls or surfaces of turbine blades of a gas turbine.

The device in accordance with the present invention features at least one inflow duct, through which cooling air or cooling fluid is introduced. The cooling fluid or cooling air exiting the inflow duct from its discharge opening flows initially into a usually pocket-like recess into which the inflow duct issues. The cooling air or cooling fluid exits from this recess or pocket and clings as a cooling film to the surface of the wall.

In accordance with the invention, the wall itself can be flat or curved. The invention can thus be used in a wide range of components.

The cooling air flowing out of the pocket-like recess and clinging like a film to the surface of the wall is slowed down. For that reason, the recess is in many cases designed such that it has a widening cross-section and acts as a diffuser.

In the embodiment of such devices for cooling the wall, it must be taken into account that a thermal barrier coating is usually applied to the wall surface to be cooled. This is achieved by means of a spraying method. In the state of the art, therefore, the geometries needed cannot always be optimally achieved because either the thermal barrier surface coating cannot be evenly applied or parts of the recess are blocked. It is also possible for steps or edges to be formed due to the thermal barrier coating, which have a negative effect on the flow behaviour.

As regards the state of the art, reference is made to EP 0 985 802 A1. In the embodiment described there, the thermal barrier coating results in a recessed step with an edge at which the flow separates. The flow can then no longer be effectively slowed down by a diffuser. Depending on the dimensioning of the recess and/or on the step formed, it may be that the exit of the cooling fluid or cooling air flow is hindered by the thermal barrier coating. As a result, instead of the required slowing down due to the diffuser shape an acceleration of the flow may occur, so that the cooling effect is considerably impaired. This kind of process can occur for example in embodiments according to US 2011/0305582 A1. For that reason, this publication provides for a groove into which the cooling air is initially introduced. Grooves of this type must however be covered before the application of a thermal barrier coating, with the covering being removed afterwards. All this leads to a considerable increase in the manufacturing costs.

The object underlying the present invention is to provide a device of the type mentioned at the beginning, which while being simply designed and easily and cost-effectively producible enables an efficient effusion cooling of the wall of a component.

It is a particular object to provide a solution to the above problems by a combination of features as disclosed herein. Further advantageous embodiments will become apparent from the present disclosure.

In accordance with the invention, a device is thus provided for cooling a wall of a component of a gas turbine. Along the wall of the component, a hot flow passes parallel to the surface of the wall. The wall can, as mentioned, be designed flat or curved. In accordance with the invention, at least one recess is provided in the wall of the component and is designed pocket-like and opening towards the surface of the wall. At least one inflow duct issues into the recess; said inflow duct extends inside the wall and cooling air can be supplied through it. The inflow duct can be arranged parallel to the wall or at an angle to the wall. The cooling air introduced through the inflow duct into the pocket-like recess then flows out of the recess and is passed along the surface of the wall of the component to be cooled so that effusion cooling can take place. Here, the air exiting from the recess is preferably slowed down. This effect is achieved in that the recess forms a diffuser and thus widens in its cross-section.

The wall of the component to be cooled is usually provided with a thermal barrier coating. This is however not absolutely necessary for the embodiment in accordance with the invention.

In accordance with the invention, it is furthermore provided that an impact wall is designed inside the recess, onto which wall the cooling air jet exiting the inflow duct impacts and is further distributed. This impact wall is, in accordance with the invention, designed double-convex like the back of a spoon. The impact wall thus forms part of a spheroid or a geometrically similar shape.

The impact wall is thus, as described above, designed convex. The description as double-convex means that the wall is convex-curved in a cross-section defined by a center axis of the inflow duct and aligned perpendicularly to the wall of the component to be cooled. The second convex curve is provided in a plane perpendicular to the just-described plane. The double-convex impact wall thus forms part of a spheroid dome. The person skilled in the art understands by the term 'dome', as known from descriptive geometry, a segment, cap or hood of the ellipsoid. In a spheroid of the type described, the longer axis of the ellipsoid used as a basis is arranged in the plane which includes the center axis of the inflow duct and is arranged perpendicular to the wall of the component to be cooled. In a preferred embodiment, the rotational axis (longer axis of the ellipsoid) is arranged at an angle to the center axis of the inflow duct. This angle can be between 5° and 45°, and preferably this angle of the rotational axis of the spheroid is set at 20°. It must be pointed out here that the arrangement and alignment of the rotational axis or rotary axis of the spheroid does not have to be equal to the impact angle which is described in the following.

In the case of a wall provided with a thermal barrier coating in the component to be cooled, the recess too and hence also the impact wall are thus coated with the thermal barrier coating. Thermal barrier coatings of this type are usually sprayed on. The cooling air jet supplied via the inflow duct thus impacts on the impact wall at an acute angle, for example at an angle between 15° and 45°, preferably at an angle of 30°. The impact wall of double-convex design distributes the cooling air jet. Due to the widening cross-section of the recess a curved diffuser is formed which slows down the flow velocity and distributes the cooling air laterally relative to the center axis of the inflow duct. At the end of the diffuser (at the end of the recess) the flow merges tangentially without any edge into the surface of the wall of the component.

The double-convex contour of the impact wall inside the recess is formed during manufacturing of the wall of the component, and the thermal barrier coating is then applied evenly, preserving the contour.

The invention can be used in particular for combustion chamber walls, but is also applicable to other components to be cooled, for example turbine blades.

In accordance with the invention, a plurality of recesses are usually provided on the wall of the component to be cooled and are each supplied with cooling air via at least one inflow duct. The individual recesses are arranged adjacent to one another, but not connected to one another.

The center axis of the inflow duct of the cooling air can in accordance with the invention either extend parallel to the surface of the wall of the component to be cooled or be arranged at an angle. In any event, the cooling air jet exiting the inflow duct hits the double-convex designed impact wall inside the pocket-like recess and is as a result evenly distributed and slowed down by the diffuser shape of the recess. In any event, the cooling air then flows without any step to the surface of the wall to be cooled and clings as an effusion film to the surface. It is particularly favourable here when the impact wall is designed symmetrical to a symmetry plane including the center axis of the inflow duct and arranged perpendicular to the wall of the component. This ensures that the exiting cooling air is evenly distributed on both sides of the double-convex impact wall and clings to the surface of the wall of the component.

In the case of a component designed in the form of a combustion chamber tile, the component can be manufactured generatively, i.e. by means of an additive method, for example by means of a laser deposition method. Then the thermal barrier coating is applied evenly over the entire surface of the wall of the component and hence also coats the recess as well as the double-convex impact wall provided inside it. The thermal barrier coating has, in accordance with the invention, no effect on the flow characteristics, since the design in accordance with the invention of the recess and of the impact wall does not allow any clogging during application of the thermal barrier coating. In accordance with the invention, the cooling air jet exiting the inflow duct thus clings to the impact wall inside the pocket-like recess and is applied by the convex shape with a curvature opposite to that shape. A flow already applied to the surface of the impact wall then exits the pocket and clings to the surface of the component to be cooled. During this process no discontinuities and no steps occur which would impair the flow. The elongated curvature of the impact wall forming part of the diffuser results in a kind of Coandă effect, by which the flow is deflected into a wall-parallel direction. Overall, the result in accordance with the invention is a marked improvement in the film cooling effect that is maintained even under severe pressure fluctuations, for example in a combustion chamber, and at high discharge rates of cooling air through the inflow duct.

Due to production in accordance with the invention by means of a generative or additive method (laser deposition method or similar), it is possible to adjust the geometry of the impact wall to the respective requirements and to align it in particular to match the center axis of the inflow duct. This would not be possible with production of the inflow duct by means of a drilling method.

Figure 7:
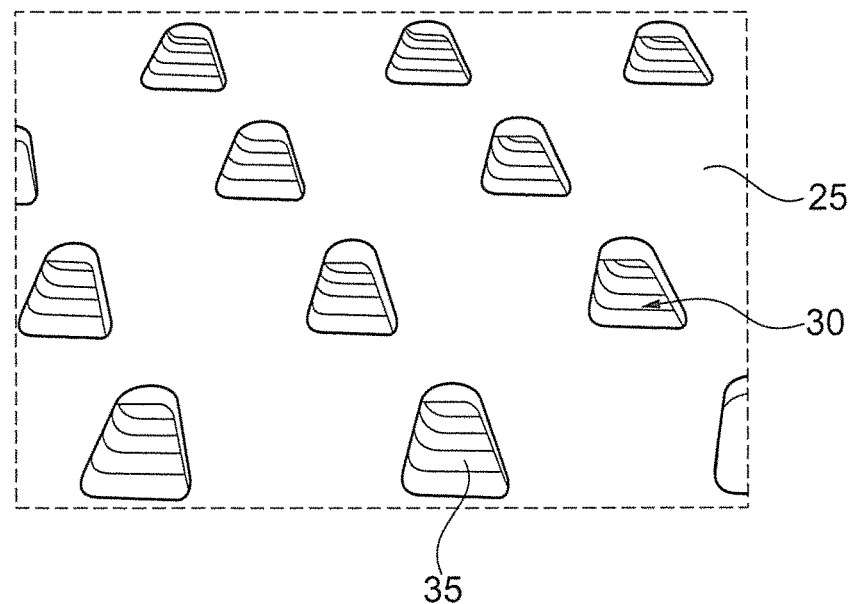
Figure 8:
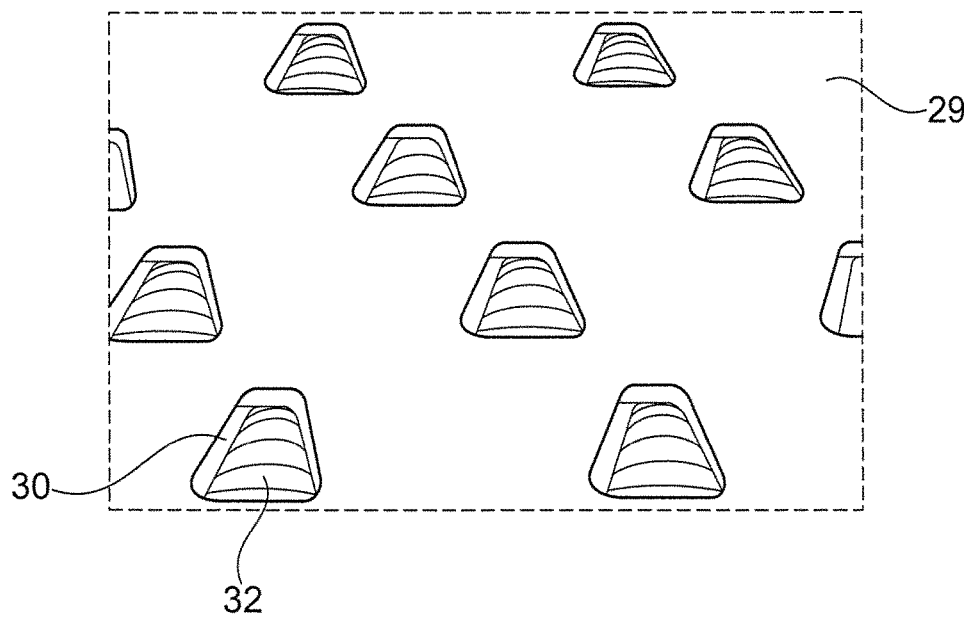

The present invention is described in the following on the basis of an exemplary embodiment in light of the accompanying drawing. In the drawing, FIG. 1 shows a schematic representation of a gas-turbine engine in accordance with the present invention, FIG. 2 shows a perspective, schematic representation of an exemplary embodiment of the device in accordance with the present invention, FIG. 3 shows a simplified sectional view, by analogy with FIG. 2, FIG. 4 shows a simplified top view, by analogy with FIGS. 2 and 3, FIGS. 5 and 6 show detail sectional views in planes perpendicular to the surface of the wall, FIG. 7 shows a top view in accordance with the state of the art, and FIG. 8 shows a top view of the exemplary embodiment in accordance with the present invention.

Figure 2:
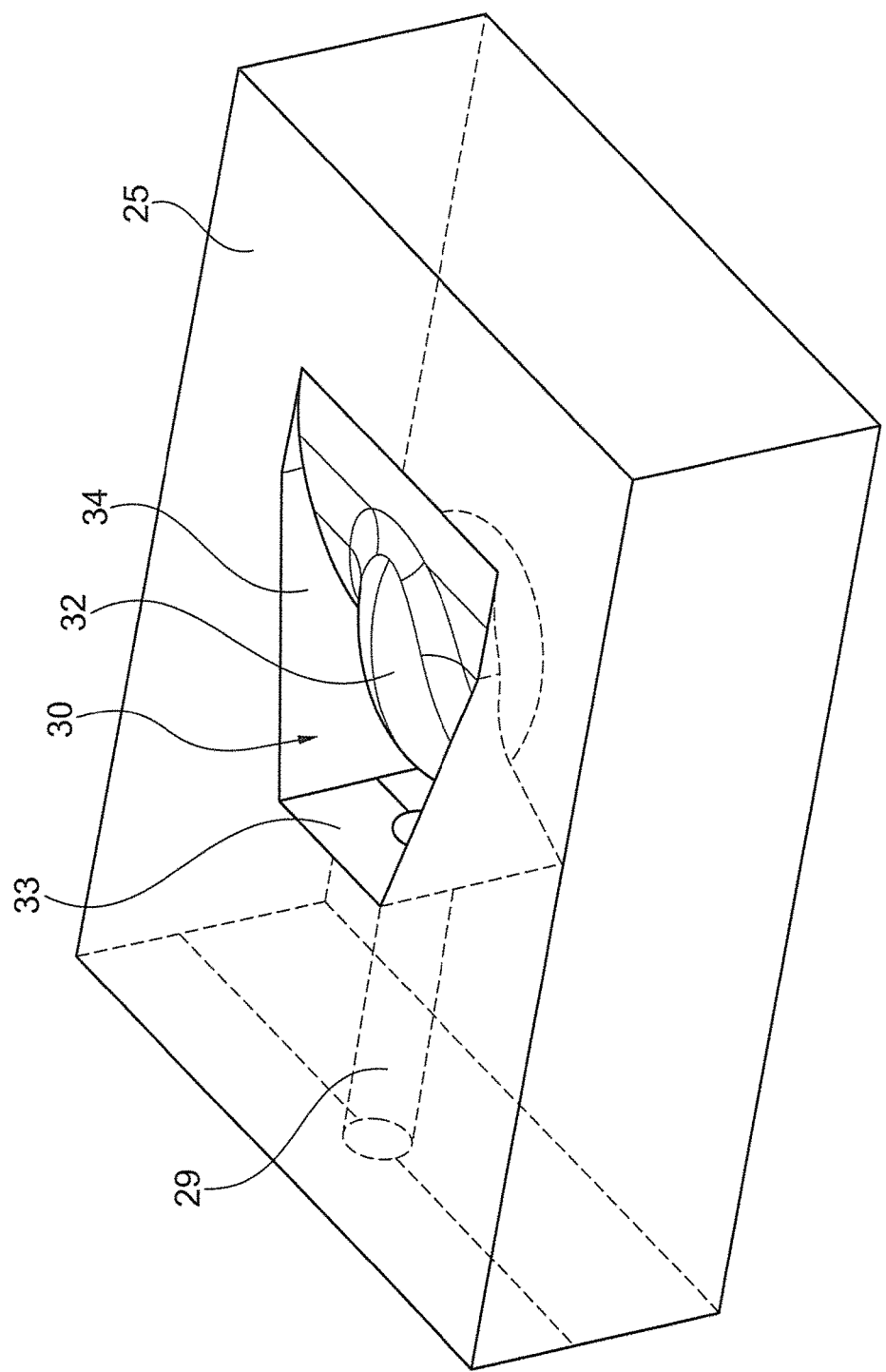

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows in a perspective view part of a wall 25 in accordance with the invention of a component, for example a combustion chamber tile. The wall 25 has a surface along which passes a hot gas flow. To cool the surface of the wall 25, an inflow duct 29 is provided which extends parallel to the surface of the wall 25, as is also shown in FIGS. 3 to 6. The inflow duct 29 has a center axis 31 and is provided in the exemplary embodiment shown with a circular cross-section.

A recess 30 of pocket-like design is provided in the wall 25 and includes a rear wall 33 in which the inflow duct 29 issues. The pocket-like recess 30 furthermore includes side walls 34 arranged at an angle to the center axis 31, such that the recess 30 widens like a diffuser starting from the rear wall 33.

Opposite to the outflow opening of the inflow duct 29, an impact wall 32 is arranged in the recess 30 and is designed in the form of a segment of a spheroid or of the back of a spoon and hence of double-convex design relative to a center axis. The segment of the spheroid is also referred to mathematically as a spheroid dome or cap or hood. FIG. 3 shows a view in a sectional plane including the center axis 31 of the inflow duct 29 and arranged perpendicular to the wall 25 of the component to be cooled. This plane, which forms a symmetry plane for the spheroid 37, is thus the drawing plane in FIG. 3. The reference numeral 36 indicates a rotational axis of the spheroid 37. This is the longer axis of the basic ellipse. The rotational axis 36 is arranged at an angle α to the wall 25, which can range from 5° to 45°. Preferably, this angle α is 20°. The spheroid is in the side view in FIG. 3 shown as a dashed line in its remaining part. As FIG. 3 shows, a cooling air jet exiting the outflow duct 29 impacts at an acute angle β the impact wall 32 and is evenly deflected to both sides. This angle β is formed between the center axis 31 and a tangent 38 at the intersection point of the center axis 31 with the impact wall 32 and is for example between 15° and 45°, preferably 30°. The cooling air thus passes over the impact wall 32 and then exits straight out of the recess 30. This means that no step or similar is formed. As a result, the flow clings without disruption to the surface of the wall 25.

FIG. 4 once again illustrates the diffuser-like widening of the recess 30.

Figure 5:
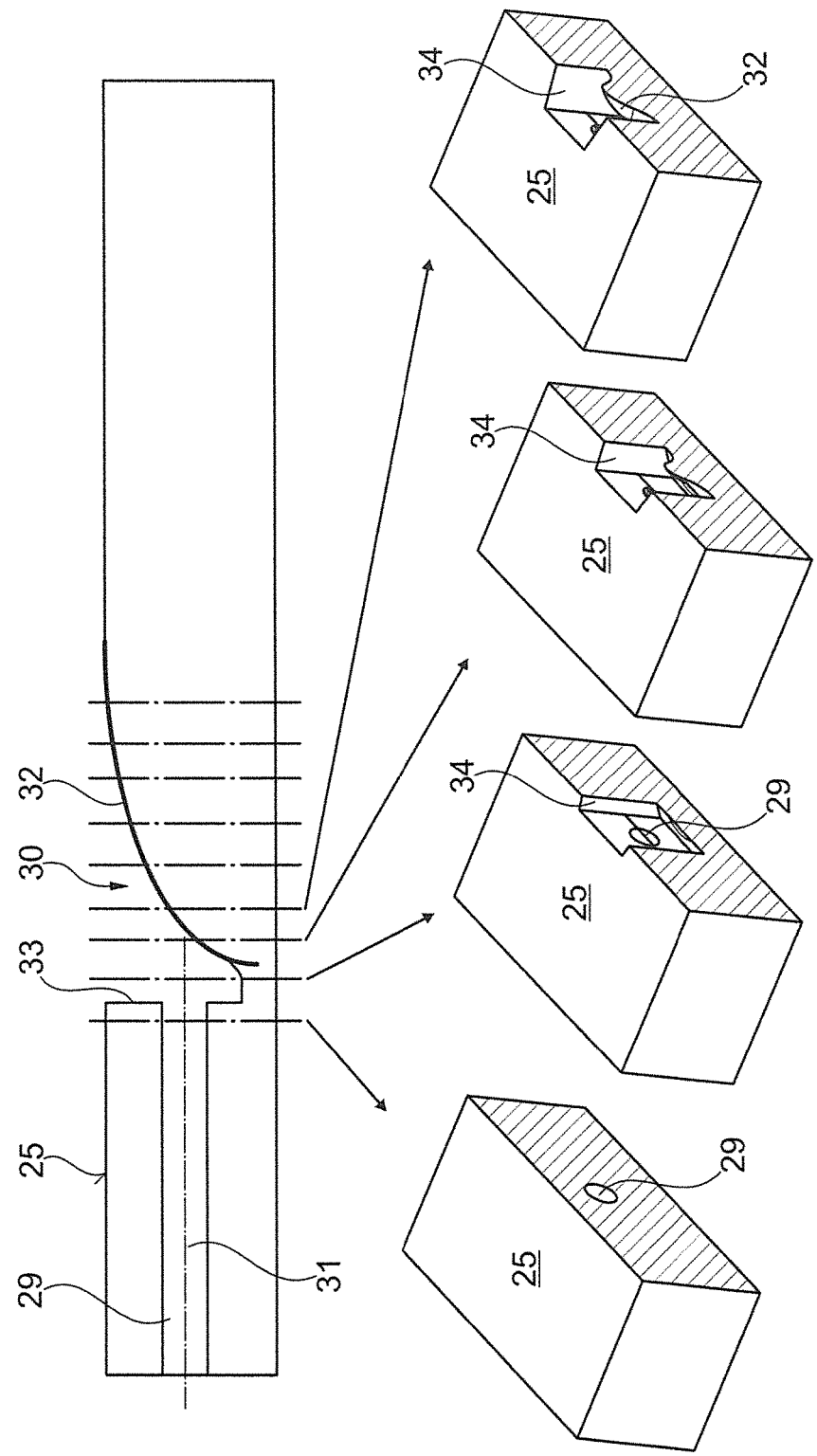
Figure 6:
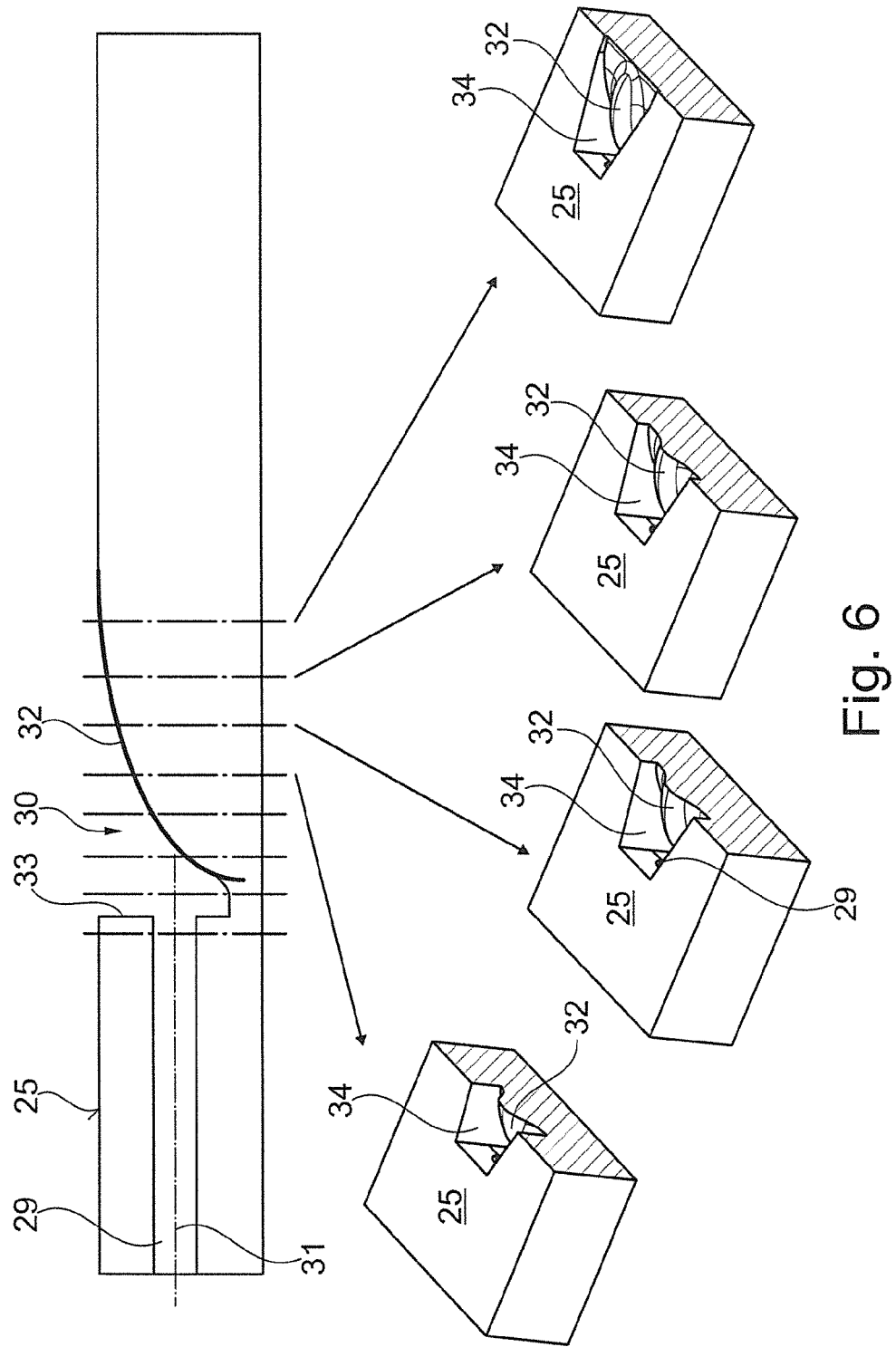

FIGS. 5 and 6 each show perspective sectional views along sectional planes arranged perpendicular to the surface of the wall 25, as resulting from the assignment of the individual sections from FIGS. 5 and 6. Here, the double-convex design of the impact wall can again be discerned in particular. It can furthermore be discerned that the impact wall 32 is symmetrical to a symmetry plane including the center axis 31 and arranged perpendicular to the surface of the wall 25.

FIGS. 7 and 8 each show arrangements of recesses 30 provided in a wall 25 of a component. FIG. 7 shows here an embodiment according to the state of the art, in which the basic surfaces 35 of the recesses 30 are designed smooth or flat, while FIG. 8 shows an embodiment in accordance with the invention with double-convex impact walls 32. From FIGS. 7 and 8 it can be discerned that the individual recesses 30 are not connected to one another, but are placed in a regular arrangement relative to one another in order to achieve an even formation of a cooling film on the surface of the wall 25.

The exemplary embodiments shown dispense, for the purposes of greater clarity, with the illustration of a thermal barrier coating that can be applied on the surface of the wall 25 and at least on the basic surface 35 and the impact wall 32 as a spray coating.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 Wall
26 Compressor drum or disk
27 Turbine rotor hub
28 Exhaust cone
29 Inflow duct
30 Recess
31 Center axis
32 Impact wall
33 Rear wall
34 Side wall
35 Basic surface
36 Rotational axis
37 Spheroid
38 Tangent

What is claimed is:

1. A device for cooling a wall of a component of a gas turbine, where a flow passes parallel to the wall, comprising:
 a recess positioned in the wall;
 an impact wall positioned in the recess, the impact wall having a double-convex shape;
 an inflow duct positioned in the wall that opens into the recess for supplying cooling air into the recess, the inflow duct including a center axis,
 wherein the center axis of the inflow duct is aligned to the impact wall;
 wherein the impact wall is shaped as a spheroid dome.

2. The device in accordance with claim 1, wherein the center axis of the inflow duct is arranged parallel or at an angle to a surface of the wall of the component.

3. The device in accordance with claim 1, wherein the impact wall is symmetrical to a symmetry plane including the center axis of the inflow duct and arranged perpendicular to the wall of the component.

4. The device in accordance with claim 1, wherein the center axis of the inflow duct intersects with a center of the impact wall.

5. The device in accordance with claim 1, wherein the wall of the component and the impact wall each further include a thermal barrier coating.

6. The device in accordance with claim 1, wherein a transition area from the impact wall to the wall of the component is free of steps.

7. The device in accordance with claim 1, wherein the recess is shaped as a diffuser.

8. The device in accordance with claim 1, wherein the recess is a singular recess opening toward a surface of the wall of the component.

9. The device in accordance with claim 1, wherein the component is a combustion chamber tile.

10. The device in accordance with claim 1, wherein an angle (α) is formed between a longer rotational axis of the spheroid dome and the wall, and the angle (α) is within a range of 5° to 45°.

11. The device in accordance with claim 10, wherein an angle (β) is formed between the center axis and a tangent at an intersection point of the center axis with the impact wall, and the angle (β) is within a range of 15° to 45°.

12. The device in accordance with claim 10, wherein an angle (β) is formed between the center axis and a tangent at an intersection point of the center axis with the impact wall, and the angle (β) is 30°.

13. The device in accordance with claim 1, wherein an angle (α) is formed between a longer rotational axis of the spheroid dome and the wall, and the angle (α) is 20°.

14. The device in accordance with claim 13, wherein an angle (β) is formed between the center axis and a tangent at an intersection point of the center axis with the impact wall, and the angle (β) is within a range of 15° to 45°.

15. The device in accordance with claim 13, wherein an angle (β) is formed between the center axis and a tangent at an intersection point of the center axis with the impact wall, and the angle (β) is 30°.

16. The device in accordance with claim 1, wherein an angle (β) is formed between the center axis and a tangent at an intersection point of the center axis with the impact wall, and the angle (β) is within a range of 15° to 45°.

17. The device in accordance with claim 1, wherein an angle (β) is formed between the center axis and a tangent at an intersection point of the center axis with the impact wall, and the angle (β) is 30°.

\* \* \* \* \*